United States Patent [19]

Brault et al.

[11] Patent Number: 4,757,316

[45] Date of Patent: Jul. 12, 1988

[54] METHOD AND DEVICE FOR MONITORING A STATION OF A LANDING AID SYSTEM OF THE MLS TYPE

[75] Inventors: Georges Brault, Boisy Sous St. Yon; Alain Grousseau, Conflans Ste Honorine, both of France

[73] Assignee: Thomson-CSF, Paris, France

[21] Appl. No.: 841,807

[22] Filed: Mar. 20, 1986

[30] Foreign Application Priority Data

Mar. 29, 1985 [FR] France ................................. 85 04852

[51] Int. Cl.⁴ ............................................. G08G 5/02
[52] U.S. Cl. ..................................... 342/173; 342/35; 342/408
[58] Field of Search ................... 342/35, 165, 173–174, 342/408

[56] References Cited

U.S. PATENT DOCUMENTS 4,568,942 2/1986 Letocquart ........................... 342/35

OTHER PUBLICATIONS

F. Fernau, "ILS Transmitter Monitors for Automatic Blind Landing"; The Radio and Electronic Engineer; (vol. 33, No. 1; 1/67), pp. 45–50.
B. Létoquart, "The MLS in France"; Microwave Journal; (vol. 24, No. 5; 5/81), pp. 113–120.

Primary Examiner—Theodore M. Blum
Assistant Examiner—Bernarr Earl Gregory
Attorney, Agent, or Firm—Roland Plottel

[57] ABSTRACT

A method and device for monitoring a station in a landing aid system of the MLS type comprising two transmission assemblies. Transmission from the electronic sweep antenna is provided alternately by said two transmission assemblies, the operation thereof being permanently tested and switching thereof being performed as a consequence.

10 Claims, 3 Drawing Sheets

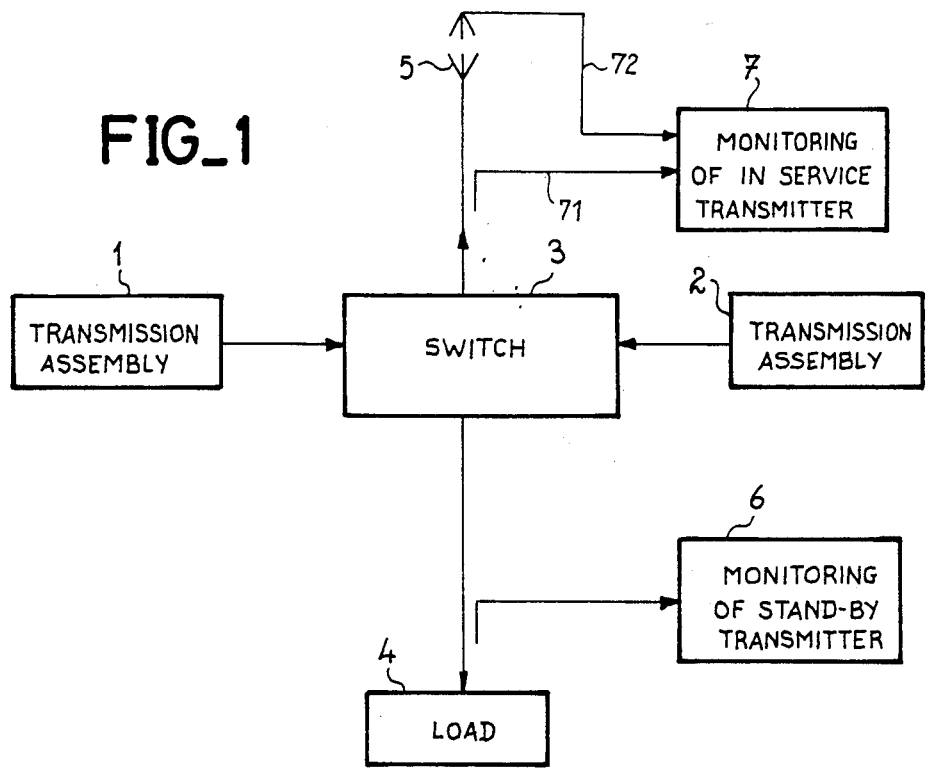
FIG_1
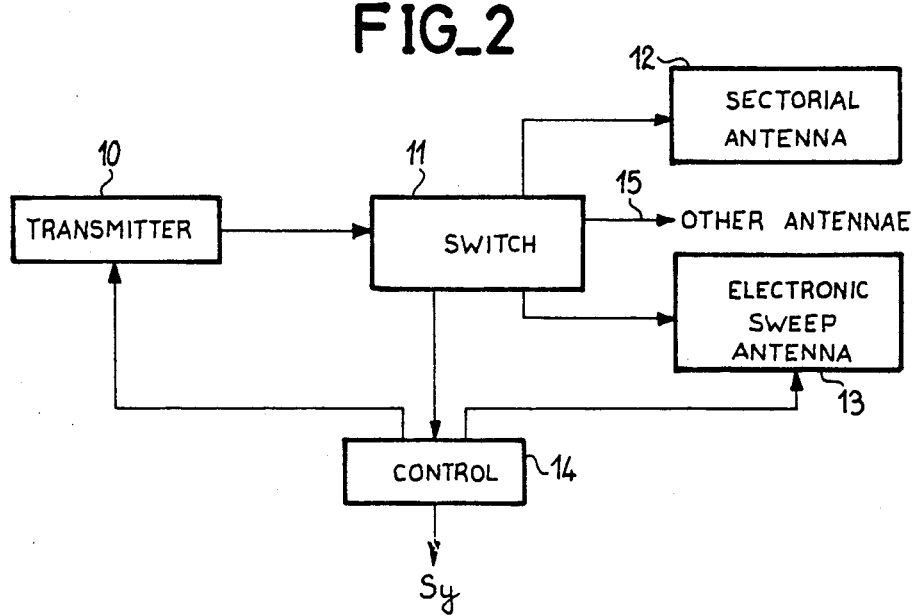
FIG_2

FIG_3
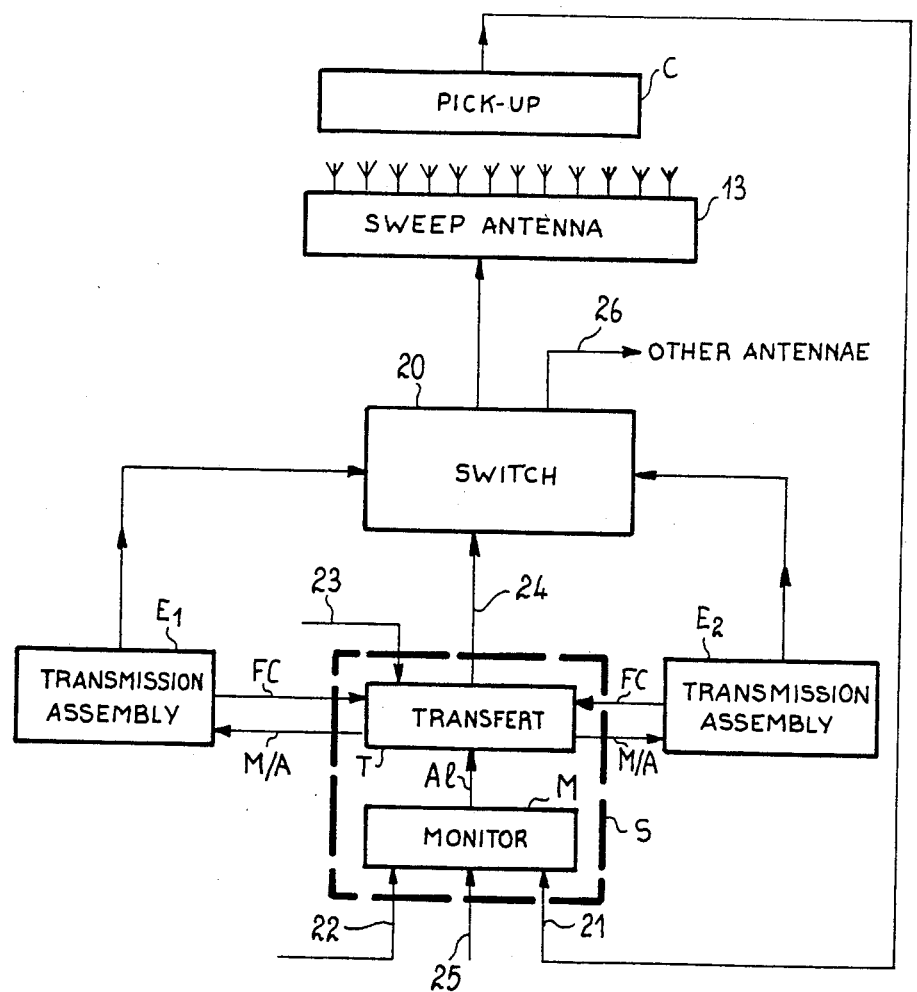

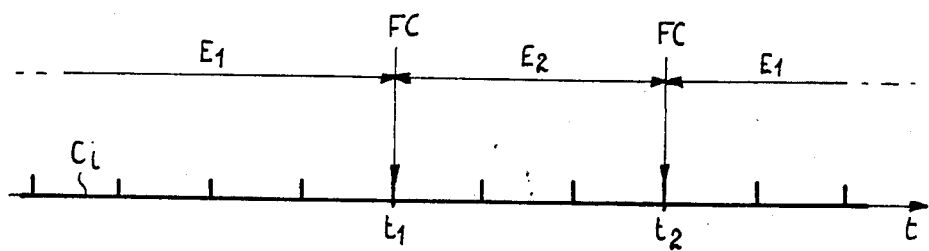
FIG_4-a
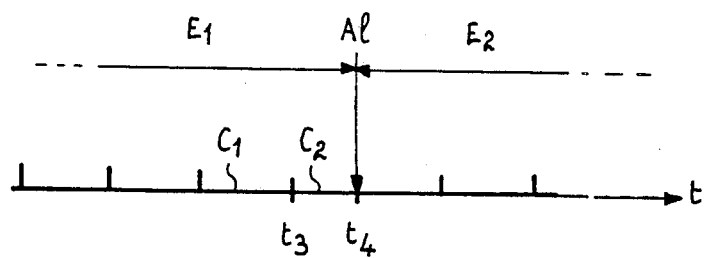
FIG_4-b
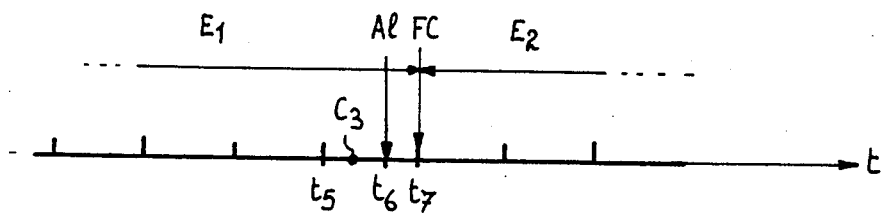
FIG_4-c

METHOD AND DEVICE FOR MONITORING A STATION OF A LANDING AID SYSTEM OF THE MLS TYPE

BACKGROUND OF THE INVENTION

1. Field of the Invention

The present invention relates to a method and device for monitoring a station of a landing aid system of the MLS (Microwave Landing System) type, whose transmission circuits are doubled.

2. Description of the Prior Art

Systems for aid to air navigation, and more particularly landing systems, must offer a maximum of safety, because of their function. The structure of these systems comprises then the following functional assemblies:

an assembly of circuits transmitting the guidance signals;
an antenna;
a monitoring device.

The purpose of the monitoring device is to check the conformity of the parameters of the guidance signal transmitted with the standards laid down by the ICAO (International Civilal Aviation Organization). In the case of too wide a discrepancy, the monitoring device must stop transmission.

It is known, more particularly for landing aid systems of the ILS (Instrument Landing System) type to double the transmitting assembly so as to increase the availability of the whole of the system. Such a configuration is shown in FIG. 1.

In this FIG. 1, the two separate transmission assemblies are referenced 1 and 2. They may be connected, one or the other, to an antenna 5 through a switching device 3. The other transmitting assembly is then connected to a load 4. The system further comprises two monitoring assembles. The first, referenced 7, is charged with monitoring the transmission assembly in service, that is to say the one which is connected to antenna 5 at a given moment. The assembly 7 may include for example a device for monitoring the transmission assembly in service before the antenna (connection 71). Such a device is often called internal monitor. The assembly 7 may further include a device for monitoring the transmission assembly in service together with the antenna (connection 72). This latter device is often called external monitor. The second assembly 6 is charged with monitoring the stand-by transmission assembly namely the one which is connected to load 4.

Operation of the two transmission assemblies 1 and 2 is permanently monitored by the two assemblies 6 and 7. When, for example, the transmission assembly in service has a defect, its monitoring assembly (7) through a control logic device not shown in FIG. 1 causes switching (3) to antenna 5 of the other transmission assembly, which was previously standing by. The transmission assembly previously in service is then switched to the load, or stopped completely, depending on the seriousness of the defect discovered.

It is apparent that such a structure uses two monitoring assemblies (6 and 7).

This structure is widely used for the ILSs. It can also be used for a system of the MLS type. However, this latter has the characteristic, with respect to the ILS, of being designed about an electronic sweep (or scanning) antenna. The preceding monitoring system has then the drawback of not allowing checking of the overall operation of the stand-by transmission assembly in association with this antenna, which is a serious drawback because of the relative sophistication and fragility of such an antenna.

An object of the present invention is to provide a method and device which are adapted to the MLS, that is to say which monitor all the components thereof, including the electronic sweep antenna and this under operating conditions.

SUMMARY OF THE INVENTION

Accordingly, the invention uses two separate transmission assemblies, connected alternately by a monitoring assembly to an electronic sweep antenna, comprising means for picking up the signal effectively transmitted by this antenna. The signals picked up are tested by the monitoring assembly, which then control the switching of the transmission assemblies and declares them, as the case may be, unavailable.

BRIEF DESCRIPTION OF THE DRAWINGS

Other objects, features and results of the invention will be clear from the following description illustrated by the accompanying drawings which show:

FIG. 1, already described, a monitoring system of the prior art;

FIG. 2 the block diagram of a station of an MLS type system;

FIG. 3, a diagram of the monitoring device of the invention in relation with the different elements forming an MLS station; and FIGS. 4a to c, different diagrams relating to the operation of the device of the invention.

In these different Figures, the same references refer to the same elements.

DESCRIPTION OF THE PREFERRED EMBODIMENTS

FIG. 2 is therefore the general block diagram of an MLS type system, apart from all means for monitoring the operation of the system.

It will be recalled that the MLS is a system for aiding an aircraft during landing by supplying it with different information, called "functions", such as its azimuth angle with respect to the axes of the landing strip, its elevation angle with respect to the horizontal, possibly other associated functions and a number of data, some called basic and the others called auxiliary. This different information is permanently transmitted from the ground and in a predefined and repetitive succession, or "cycle", by time multiplexing on the same frequency, in accordance with the characteristics standardized by the ICAO. This information is decoded by each aircraft concerned.

Each of the preceding functions eomPrises two parts, transmitted successively and forming a "modulus":

A preamble, whose role is to supply the aircraft with an identification of the function which is to follow. This preamble is transmitted by a so called sectorial antenna, that is to say a fixed antenna transmitting over the whole of the zone, or sector, which the MLS is to cover. This preamble is in the form of a binary word, transmitted in DPSK modulation.

The function properly speaking. In the case where this function is data, it is transmitted by the sectorial antenna, also in DPSK modulation. In the case where this function is angular information, it is supplied by the angular scanning of the whole coverage sector of the MLS by a narrow beam, outgoing then returning. by means of an electronic sweep antenna, in accordance with the principle Called TRSB (Time Reference Scanning Beam).

A MLS comprises a plurality of stations, usually one for each angular function, some of these stations in addition transmitting data.

The diagram of FIG. 2 comprises a transmitter 10 transmitting a wave at about 5 GHz, directed by means of a switching circuit 11 either to a sectorial antenna 12, or to an electronic sweep antenna 13, or towards (arrow 15) other associated antennae (so called OCI antennae for example). Elements 10, 11 and 13 are controlled by a control means 14.

More precisely, transmitter 10 comprises, connected in cascade:

a frequency generator delivering a wave close to 5 GHz;

a phase modulator, providing DPSK modulation, for transmitting the preamble and the data at the command of means 14;

an on/off control circuit formed for example by an amplitude modulator, also controlled by means 14;

a power transmitter, whose purpose is to deliver the required power, usually of the order of 20 W.

The electronic sweep antenna 13 conventionally comprises the following elements: N radiating elements; digital phase shifters feeding the radiating elements; a divide-by-N power divider receiving the energy delivered by transmitter 10 and a circuit for controlling the digital phase shifters.

The purpose of the control means 14 is mainly to control the preceding blocks, more particularly for providing the logic sweeping function for antenna 13 and connection with the other stations of the MLS system for synchronization purposes. It is formed for example by means of a microprocessor.

FIG. 3 shows schematically the monitoring assembly of the invention in its relation with different component elements of an MLS station.

In this Figure, we find then the electronic sweep antenna 13 and a block $E_1$ represents schematically the whole of the transmitting 10 and control 14 blocks of FIG. 2. This block $E_1$ is called transmission assembly. The MLS station comprises two such transmission assemblies, the second being referenced $E_2$. These two assemblies are able to be connected to the sweep antenna 13 and to other antennae of the MLS station (arrow 26) through an assembly of switching circuits referenced as a whole at 20. This assembly 20 may be formed from the circuit for switching the antennae 11 of FIG. 2.

The system of FIG. 3 further comprises a monitoring assembly S, receiving a certain amount of information and more particularly, the signal transmitted by antenna 13 such as received by a pick-up or Probe C. This pick-up C may be formed either by an external pick-up, for example of the horn type similar to the receiver carried by the aircraft to be guided, placed at a few tens of meters from antenna 13. It may also be formed alternately or cumulatively with the preceding one, by a signal pick-up device situated at the level of the sweep antenna itself, known under the name of "integral monitor".

The monitoring assembly S is broken down into an assembly of circuits called as a whole "monitor" and referenced M and an assembly of circuits called as a whole "transfer" and referenced T. The purpose of monitor M is to carry out predefined tests on the information which it receives from different pick-ups, that is to say to make measurements on this information and to compare them with reference values which it has stored in memory. When the differences between the measurement results and the reference values exceed predefined limits, the monitor M delivers an alarm to transfer T, informing this latter that the transmission assembly in service ($E_1$ or $E_2$) is defective. In order to improve the reliability of the system, monitor M may be doubled, or more. The transfer T is a control means, which controls the switching (or "transfer") of assemblies $E_1$ and $E_2$ to antenna 13, depending on the choice of the operator responsable for running the MLS station (which choice concerns more particularly the transmission assembly normally in service and the test program to be used) on the test program chosen and on the alarms received.

More precisely, monitor M receives at an input 21 the signal picked up by pick-up C. It may also receive information at other inputs, referenced as a whole at 22, coming from other pick-ups which pick up in any known way, at their output, the different signals generated by the MLS station, such as the control of the phase shifters, the DPSK signal, the signal for connection with the other stations, etc. In a variant embodiment, the monitor M further receives at an input 25 control information coming from switch 20, for checking the effective operation of this latter.

The transfer device T receives the alarms (Al) supplied by monitor M, end of cycle information (FC) for each of the transmission assemblies $E_1$ and $E_2$ in turn, and it may receive external information (commands) at an input 23. These external commands come from an operator situated either in the station, or at a distance, in the control tower for example: it is then a question of remote controls concerning more particularly the on/off order for the station, the automatic or manual operating mode (in which the effect of the alarms is inhibited) of the station, the choice of a test program, possibly the choice of one of the assemblies $E_1$ and $E_2$ for providing normal transmission from the station, outside the test periods of the other assembly. The transfer sends (arrow 24) to the switching device 20 the order for selecting assembly $E_1$ or assembly $E_2$. It also supplies to each of the assemblies $E_1$ and $E_2$ an on/off order (M/A).

The alarms (Al) sent by monitor M to transfer T are, in this embodiment, of several types:

So called primary alarms, which are serious alarms indicating a deterioration of the signal such that the transmission of the assembly in service must be stopped. This type of alarm is set off for example when the angular indication error becomes greater than a predefined threshold, when the error rate in the preamble becomes greater than a certain threshold, when overlapping of different MLS functions occurs.

So called secondary alarms, which correspond to defects not requiring stopping of the transmission but which should be caused to cease by choosing the better of the two assemblies available. They concern parameters of lesser importance or they form warnings of a future primary alarm, such as lowering of the transmission power.

Prealarms, which are associated with the primary alarms and with the secondary alarms and which are set off at a threshold lower than the threshold triggering off the preceding ones. They have no action on the operation but are only stored for maintenance purposes.

Discrepancies between two or more monitors, when monitor M is multiplied.

In FIGS. 4 and 4b have been shown different diagrams illustrating as function of time (t) the switching mode for switching from one transmission assembly to the other in the system of the invention.

FIG. 4a shows a case of normal operation. One of the transmission assemblies, for example assembly $E_1$, is used as assembly normally in service and transmits its information successively, cycle after cycle. By way of example, four MLS cycles have been shown one of which is referenced $C_i$. At a time $t_1$ which corresponds to the end of a cycle, the transmission assembly in service ($E_1$) sends an end of cycle signal (FC) to the transfer circuit T. This latter orders (order 24) the switching circuit 20 to connect the stand-by assembly (in our example assembly $E_2$) to the antennae and more particularly to the sweep antenna 13, this for a whole and limited number of cycles: in the example shown in FIG. 4a, for three cycles, the third finishing at a time $t_2$. At this time $t_2$, assembly $E_2$ in its turn sends end of cycle information (FC) to the transfer circuit T which then orders, through the switching circuit 20, reconnection of the first assembly ($E_1$) to antenna 13.

Thus, each of the transmission assemblies $E_1$ and $E_2$ is alternately connected to the antennae and may be tested in all its parameters. In the above described operational mode, the stand-by assembly is therefore only connected to antenna 13 for a few cycles, so as to be tested, the assembly in service ensuring the major part of the transmissions. Other operational modes are of course possible, in which normal transmission of the station is divided between the two transmission assemblies, in proportions chosen by the operator.

The diagram shown in FIG. 2b illustrates a case of detecting a primary alarm. Up to moment $t_3$, the assembly in service (for example still assembly $E_1$) is operating satisfactorily. The last cycle before time $t_3$ is referenced $C_1$. At time $t_3$ a cycle $C_2$ begins during which there occurs, at a time $t_4$, a primary alarm A1 detected by the monitor M. In accordance with the invention, the transfer T then orders instantaneously, without waiting for the end of the MLS cycle, switching of the stand-by assembly ($E_2$) to the antennae. In fact, as was mentioned above, the primary alarm corresponds to a defect such that the operation of the station, or at least of its transmission assembly, must be stopped so as not to broadcast erroneous information. At this time, assembly 2 becomes the assembly in service and generally permanently, unless a primary alarm is subsequently detected on assembly $E_2$, this latter alarm then causing stopping of the station.

The diagram shown in FIG. 4c illustrates the case of a secondary alarm. Until time $t_5$, the assembly in service ($E_1$, for example) is operating satisfactorily. At time $t_5$ a cycle begins referenced $C_3$ during which, at time $t_6$, a secondary alarm is sent by monitor M to the transfer T In this case, contrary to the case of FIG. 4b, transfer T waits to receive an end of cycle information FC, which arrives at a time $t_7$, before ordering switching of the antennae (particularly 13) to the stand-by assembly ($E_2$). From time $t_7$, it is the stand-by assembly ($E_2$) which ensures the transmission of the station and which becomes the assembly in service.

Systematic switching at end of testing nevertheless continues to be carried out so as to periodically reconsider the state of the assembly previously in service ($E_1$). The respective states of the two assemblies $E_1$ and $E_2$, which are thus known sequentially, are stored and permanently compared and it is the better of the two assemblies which is connected to the antennae, the other assembly continuing to be tested periodically, as long as no primary alarm appears. In one embodiment, if the two assemblies are in the same state (absence of alarm or secondary alarm), the transfer T orders return to the initial assembly ($E_1$). Concurrently with the foregoing, in one embodiment, all the secondary alarms relative to the same assembly E are grouped together and the choice of the better assembly is made depending on the presence or absence of a secondary alarm or alarms. In another embodiment, the choice of the better transmission assembly is made, in a more elaborate way, depending on the number of secondary alarms recorded on each assembly, which number is possibly weighted by a predefined quality coefficient.

For controlling the operation described in FIG. 4, transfer T receives, as was mentioned above, the whole of the primary alarms which it groups together, the whole of the secondary alarms which it groups together or not depending on the operational mode selected, external commands (input 23) which allow it more particularly to initialize the system and to control its on/off state. It is formed by a logic circuit formed from a table of the table of truth type, giving the correspondance between the signals received at the input and the desired operations in the different possible cases, operations such as on/off state of assembly $E_1$, on/off state of assembly $E_2$, control for switching assembly $E_1$ to assembly $E_2$ or vice versa. An assembly such as T may be formed by means of a microprocessor or wired logic circuits.

It should be further noted that certain anomalies do not immediately give rise to an alarm: they are filtered and the corresponding alarm only appears, if such be the case, after a time $T_o$. During switching from one transmission assembly E to the other, it is then necessary to inhibit for the time $T_o$ the possible alarms sent by monitor M to transfer T: it would not in fact be known, during time $T_o$, to which transmission assembly to assign it. This delay $T_o$ imposed on certain alarms must however be determined so as to be compatible with the ICAO rules concerning the maximum time tolerated for an off standard transmission.

It follows from the foregoing that each of the transmission assemblies $E_1$ and $E_2$ operates in turn, (systematic) switching taking place as a rule at the end of the MLS cycle, except in the case of a primary alarm when the stand-by assembly is immediately brought into service, but in all cases takes up again the interrupted cycle from its beginning. This mode of operation has the double advantage of allowing the two transmission assemblies to be tested and any need of synchronization between the assemblies to be avoided, while offering to the aircraft a signal without discontinuity when no serious defect appears. In fact, the end of cycle signal FC is not a synchronization signal but a time reference indicating the time at which the switching must be carried out.

Furthermore, it should be noted that the switching need not necessarily be made at the end of the MLS cycle. It may take place at any time provided that it does not disturb the transmission of the MLS station beyond what is allowed by the ICAO standards. By way of example, systematic switching may take place in the middle of the cycle, but at the end of a modulus.

The system of the invention has the following further advantages:

It checks the signal actually transmitted over the antennae by the assembly service.

It further checks the signal transmitted by the stand-by assembly on the same antennae, also under operational conditions, these two aspects being particularly important in the case where an electronic sweep antenna is concerned.

Only a single monitor M is required which provides, on the one hand, a reduction of the equipment costs with respect to a system such as the one shown in FIG. 1 and, on the other hand, with the monitoring functions being also fulfilled with respect to the system of FIG. 1, an improvement in the reliability of the assembly of the system;

monitor M may further be doubled (or more), in parallel, but only for improving the reliability of the system;

the transmission assembly considered as "stand-by" is checked by a monitor of the same integrity (single, double or more) as the assembly in service.

The above description has been given of course by way of non limitative example. Thus, more particularly, an MLS station has been described comprising two transmission assemblies ($E_1$ and $E_2$) but they may be multiplied without modifying the operation of the monitoring method/device of the invention. Thus also an information FC has been described given at the end of a cycle, but it may be supplied at any time, provided that the receiving means (transfer T) as a consequence recalculates the end of cycle time.

What is claimed is:

1. A method of monitoring a station of a landing aid system of the MLS type, said station transmitting MLS information grouped together in identical cycles, said station comprising:

an electronic sweep antenna;
   two MLS information transmission assemblies;
   switching means providing connection of said transmission assemblies to said antenna;
   means for monitoring the operation of the station, comprising means for picking up the signal transmitted by said antenna, said method comprising:
   switching the two transmission assembles alternately to said antenna to thereby cause the transmission of MLS information signals alternately from each of the two transmission assemblies to the antenna; testing signals with said monitoring means, said testing signals being supplied by said pick-up means and, switching said transmission assembles when an operating defect is detected.

2. The method as claim 1, wherein, during normal operation, switching takes place at the end of a cycle.

3. The method as claimed in claim 1, wherein the operating defects are classified in categories, said classification comprising primary alarms whose appearance causes immediate switching of said transmission assemblies.

4. The method as claimed in claim 3, wherein switching of said transmission assemblies caused by the appearance of said primary alarm is definitive, the assembly for which the alarm was set off being stopped.

5. The method as claimed in claim 1, wherein the defects are classified in categories, said classification comprising secondary alarms whose appearance causes switching of said transmission assemblies at the end of a cycle in progress.

6. The method as claimed in claim 5, comprising a step for storing said secondary alarms, for comparing said transmitting assemblies at all times.

7. The method as claimed in claim 6, wherein, when said two transmission assemblies have given rise to secondary alarms, said switching of the assemblies is performed as during normal operation.

8. The method as claimed in claim 1, wherein, in the case where one of said transmission assemblies is brought into service after detection of an operating defect, said transmission assembly begins its transmission at the beginning of a cycle.

9. The process as claimed in claim 6, wherein, during normal operation, one of said transmission assemblies provides the major part of the MLS cycles, the other of said transmission assembly being brought in service periodically, for a limited number of cycles.

10. A monitoring device for implementing the method claimed in claim 1, wherein said monitoring means comprise:
    a monitor assembly receiving the signal transmitted by said antenna, for carrying out operating tests on this signal and generating alarms when required;
    a transfer assembly receiving the alarm and controlling switching of said transmission assemblies.

* * * * *